United States Patent [19]

Brewer

[11] Patent Number: 5,063,799
[45] Date of Patent: Nov. 12, 1991

[54] TOOLHOLDER FOR BAR MACHINES AND THE LIKE

[76] Inventor: Darrell K. Brewer, 115 Little Mountain Rd., Huntsville, Ala. 35803

[21] Appl. No.: 590,948

[22] Filed: Oct. 1, 1990

[51] Int. Cl.⁵ ............................................. B23B 29/04
[52] U.S. Cl. ......................................... 82/158; 82/159
[58] Field of Search ................................. 82/158–160, 82/161

[56] References Cited

U.S. PATENT DOCUMENTS

| | | | |
|---|---|---|---|
| 735,138 | 8/1903 | Normand | 82/158 |
| 2,391,878 | 1/1946 | Cassia, Jr. | 82/158 |
| 2,684,608 | 7/1954 | Roman | 82/158 |
| 3,566,723 | 3/1971 | Oborne | 82/158 |
| 4,583,434 | 4/1986 | Moody et al. | 82/158 |

Primary Examiner—Steven C. Bishop
Attorney, Agent, or Firm—John C. Garvin, Jr.

[57] ABSTRACT

This invention relates to an adjustable toolholder for use with multiple spindle bar machines and the like. The adjustable toolholder includes a mount member adapted for securement to a toolslide of the machine, a toolholder body for mounting within a way on the mount member, and precision means for slideably adjusting the toolholder body within the way of the mount member. The toolholder body can be precisionally adjusted relative to the mount member by the mere turning of a calibrated vernier, knob, with no loosening of any through-bolts or the like.

14 Claims, 7 Drawing Sheets

TOOLHOLDER FOR BAR MACHINES AND THE LIKE

TECHNICAL FIELD

This invention relates to toolholders for multiple spindle bar machines and the like, and more particularly to improved adjustable toolholders for use with such machines.

BACKGROUND OF THE INVENTION

The prior art abounds with toolholders for chucking or clamping tools for machines such as lathes, bar machines, milling machines and the like. The most common of such toolholders presently used with bar machines is illustrated in FIG. 1 of the drawing. This most common toolholder as well as all other known toolholders designed for use with bar machines have the disadvantage or drawback in that it is most difficult to adjust the toolholder once it is in a supposed, desired, position on the toolslide of the machine. For example, with the most common prior art toolholder shown in FIG. 1, its adjustment is accomplished by loosening the four bolts which clamp the toolholder to the toolslide and tapping the toolholder with a wrench or the operator's hand. This procedure involves substantial trial and error, numerous taps on each side of the toolholder, is time consuming, and hinders precision adjustments.

U.S. Pat. No. 4,583,434 discloses a precision adjustable toolholder which is secured to the cross slide of a machine by a pair of through-bolts, one of which secures only a fixed base block to the cross slide and the other which secures not only the fixed base block to the cross slide but also an adjustable tool holding block to the cross slide. This construction permits a precision adjustment of the adjustable tool holding block by a vernier screw after the loosening of the through-bolt which passes through both the fixed base block and the tool holding block, but incorporates no way for supporting and retaining the tool holding block, and is intended for use with light-duty machines and not heavy-duty machines such as bar machines which normally require at least four bolts for mounting to the toolslide. The structure disclosed by this U.S. Pat. No. 4,583,434 has the drawback or disadvantage in that it incorporates no way for supporting and holding the tool holding block on the mount member and is not adaptable for use with heavy-duty machines such as bar machines.

In accordance with the present invention, a novel and improved form of precision adjusting toolholder is provided which is reliable in operation, relatively simple in construction, saves time in set-up, permits a quick change of tools, and merely requires the loosening of a minimum number of bolts and the turning of a vernier screw to make a precision adjustment to the tool holding body, and overcomes the drawbacks and disadvantages of known toolholder assemblies, particularly those intended for use with large, complicated, bar or screw machines.

An object of the present invention is to provide a toolholder which requires only a simple operation or movement to cause a precision adjustment to the toolholder.

Another object of the present invention is to provide a toolholder requiring only a simple operation to cause a precision adjustment to the toolholder and which is also simple in construction, yet is durable and relatively inexpensive to manufacture and use.

These objects as well as other objects of the invention will become more readily apparent after reading the following description in conjunction with the accompanying drawings.

DESCRIPTION OF THE PREFERRED EMBODIMENT

Figure 1:
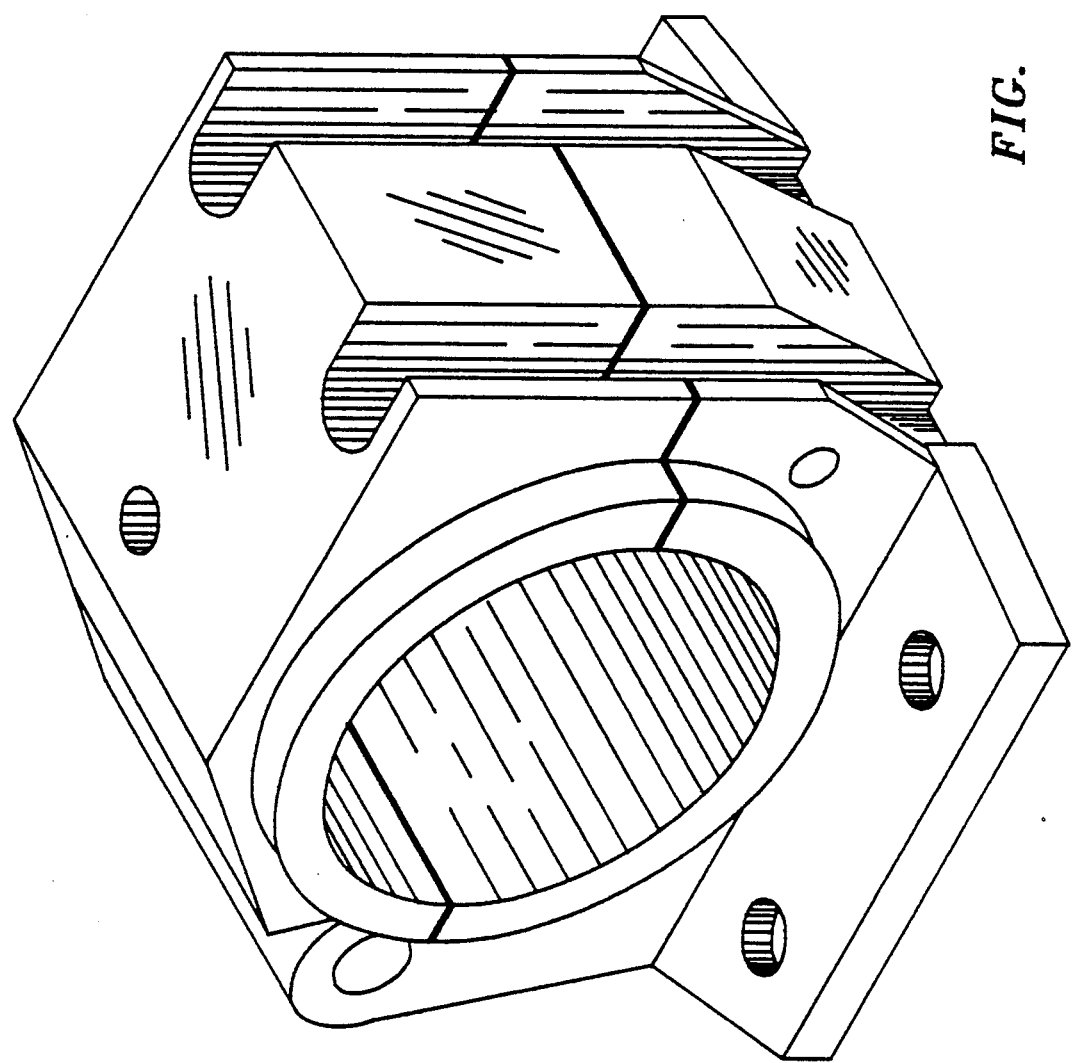
FIG. 1 is a perspective view of the most common of all prior art toolholders for mounting on a toolslide of a conventional multiple spindle bar machine.
Figure 2:
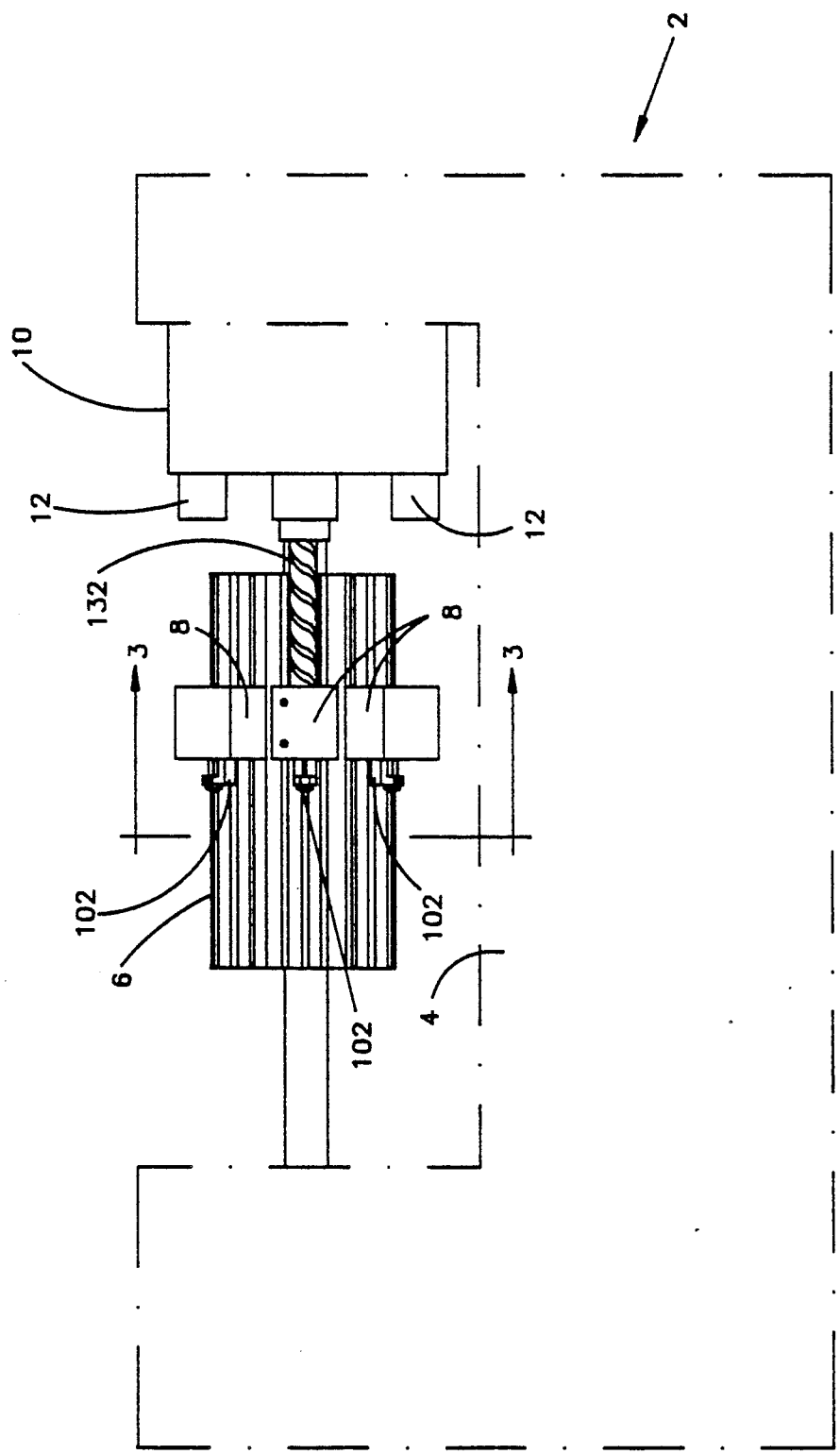
FIG. 2 is a side elevational view of a typical bar machine showing the toolholder embodying the principles of the invention supporting a tool (drill bit) and mounted on the toolslide of a conventional multiple spindle bar machine.
Figure 3:
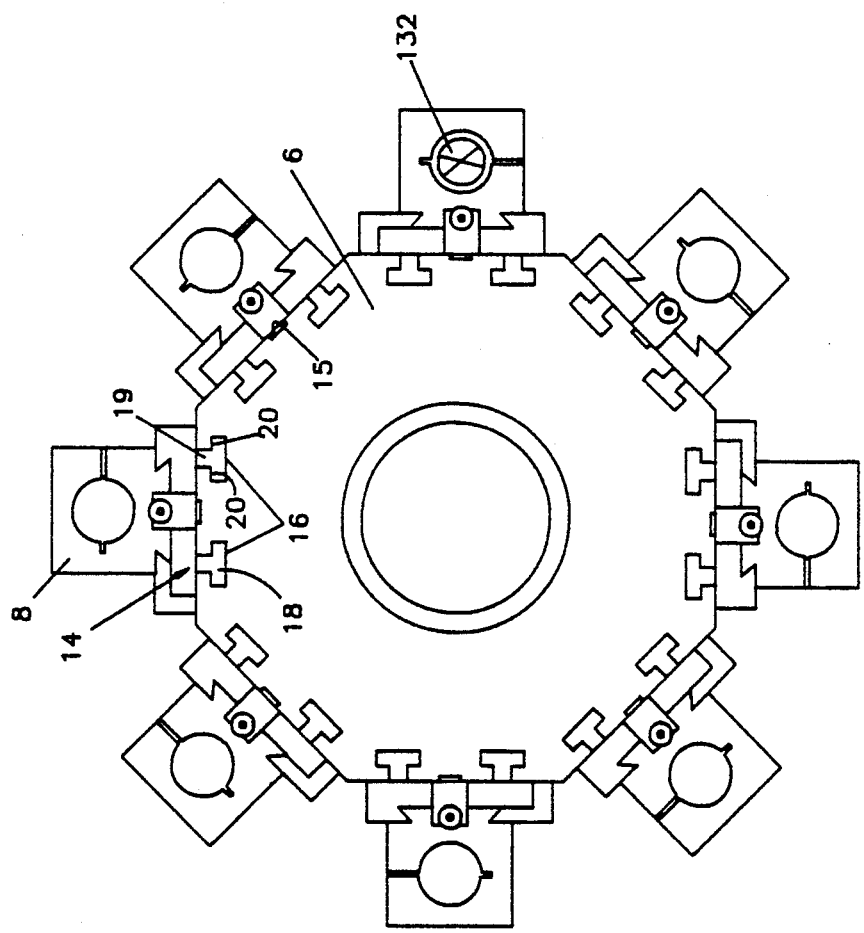
FIG. 3 is an enlarged transverse sectional view taken substantially along line 3—3 of FIG. 2 showing the mounting of a plurality of toolholders of the present invention on the toolslide of a conventional multiple spindle bar machine.

FIGS. 2 and 3 illustrate, by way of example, one environment wherein the adjustable toolholder of the present invention might be utilized. Reference numeral 2 generally designates a multiple spindle bar machine including a bed 4, a toolslide 6, a plurality of toolholder assemblies 8, and a spindle carrier assembly 10. The toolslide 6, as illustrated in FIGS. 2 and 3, is generally octagonal in shape, in that it has eight sides, for the mounting of eight toolholder assemblies 8; however toolslide 6 could incorporate any number of sides, such as four or six, to accommodate an equivalent number of toolholder assemblies 8. Each side of toolslide 6 incorporates a rectangular recess 15 at its center flanked by two inverted T-shaped channels 14, each including a base 16, an elongated opening 18, a center groove 19 and opposed shoulders 20.

Figure 4:
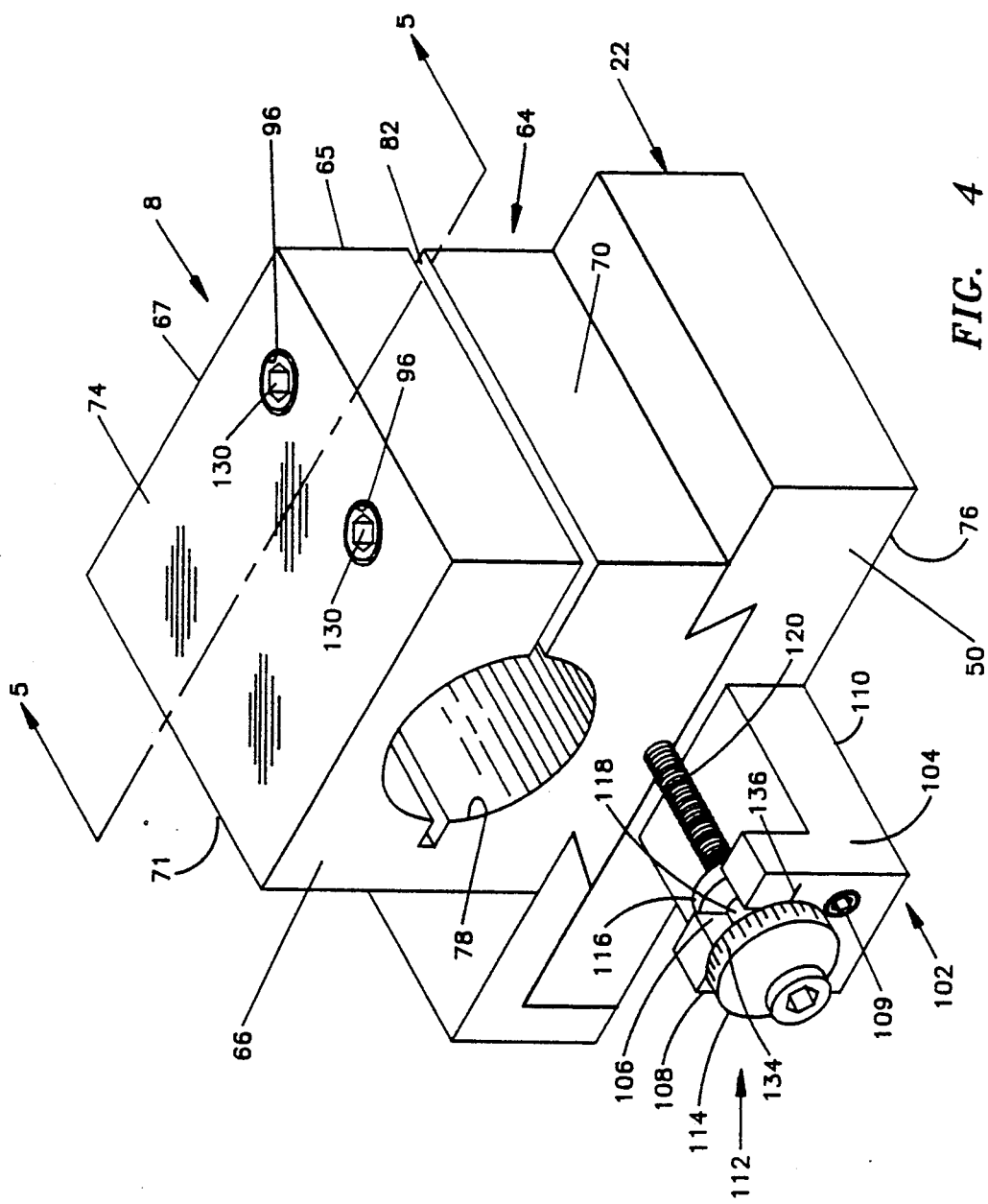
FIG. 4 is a perspective view of the adjustable toolholder of the present invention in an unmounted condition.
Figure 5:
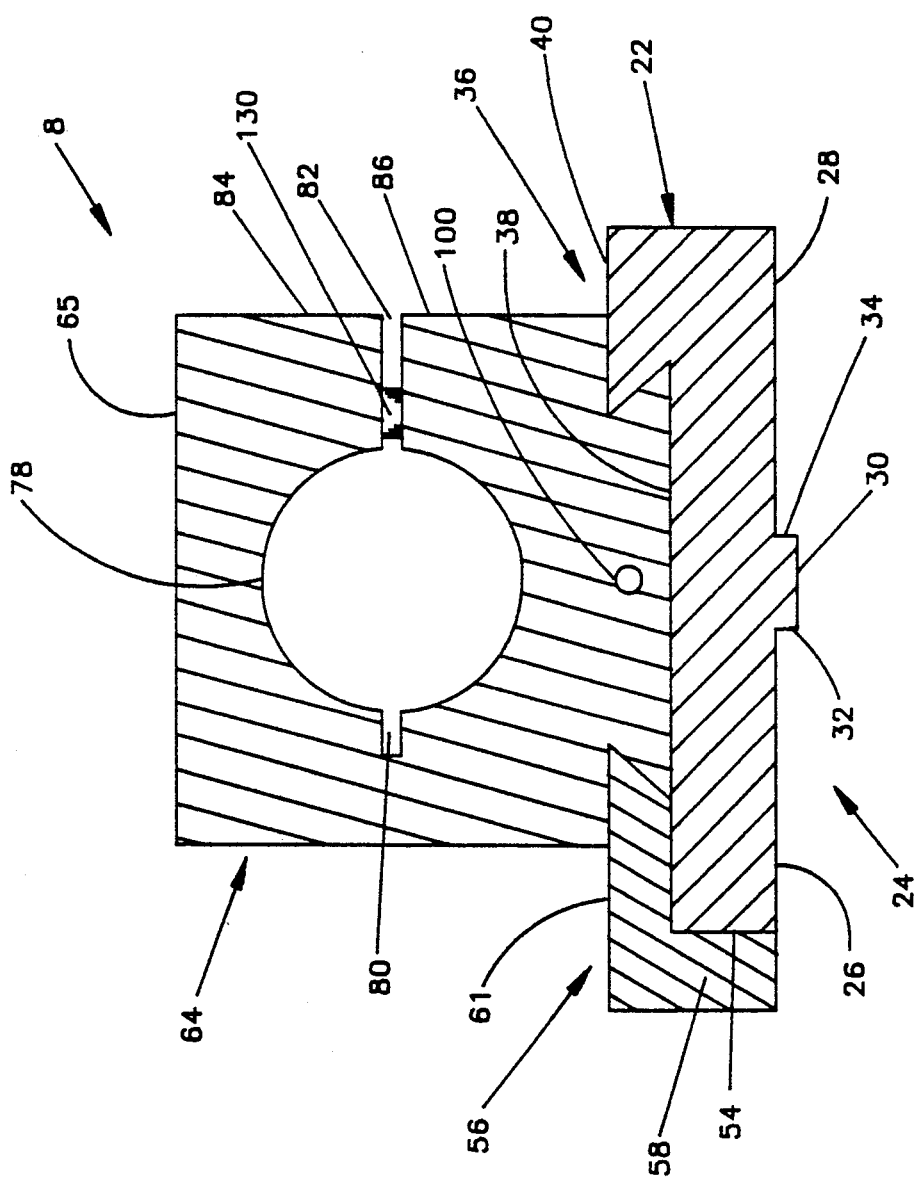
FIG. 5 is a transverse sectional view of the adjustable toolholder of the present invention taken substantially along line 5—5 of FIG. 4.
Figure 6:
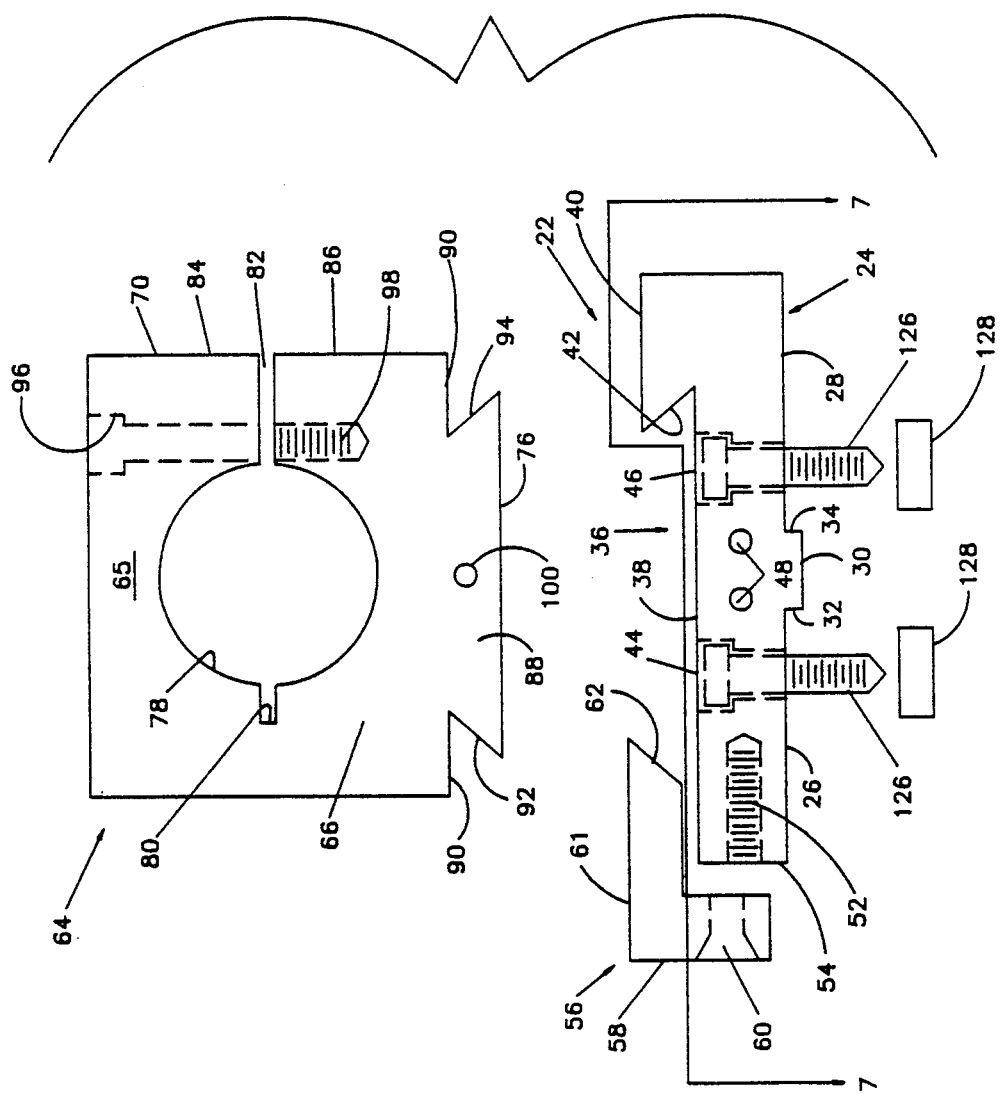
FIG. 6 is an exploded view showing details of the toolholder mount including its cooperating L-shaped member and the toolholder body of the toolholder of the present invention.
Figure 7:
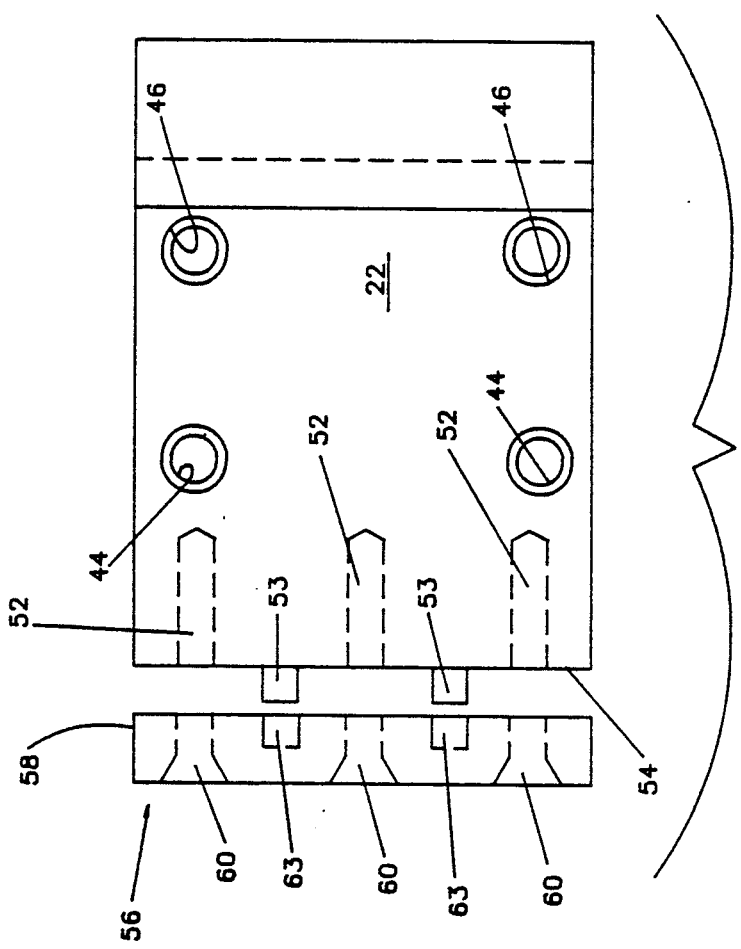
FIG. 7 is a sectional view of a portion of the toolholder of the present invention taken substantially along line 7—7 of FIG. 6.

FIGS. 4–8 illustrate, by way of example, the preferred embodiment of the toolholder assembly 8 for mounting on each side of toolslide 6. The toolholder assembly 8 of the preferred embodiment comprises a toolholder mount 22, a toolholder body 64, and adjusting means 102 for precisely adjusting the toolholder body 64 in toolholder mount 22. The toolholder mount 22 includes a lower face 24 divided into end sections 26 and 28 which are separated by a protrusion 30 having parallel edges 32 and 34, and an upper face 36 made up of lower tier 38 and upper tier 40 separated by a tapered wall 42 (FIG. 6) defining an angle substantially less than ninety degrees at the point where tapered wall 42 joins with lower tier 38. Two pairs of countersunk bores 44 and 46 (FIG. 6) are formed in lower tier 38 of upper face 36 so that the pair of bores 44 pass through end section 26 of lower face 24 adjacent edge 32 of protrusion 30 and the pair of bores 46 pass through end section 28 of lower face 24 adjacent edge 34 of protrusion 30. As seen in FIG. 6 a pair of tapped bores 48 are cut in edge 50 of toolholder mount 22 to run parallel with edges 32 and 34 of protrusion 30 and as seen in FIG. 7, three tapped bores 52 are cut in edge 54 of toolholder mount 22 to run generally perpendicular to bores 48. Two dowel pins 53 are mounted in edge 54 of toolholder mount 22, one on each side of the middle tapped bore 52 on edge 54 of toolholder mount 22. A separate inverted L-shaped member 56 (FIGS. 6 and 7) is provided for connection to toolholder mount 22 to complete toolholder mount 22. L-shaped member 56 (FIGS. 6 and 7) includes a first leg 58 having three countersunk bores 60 and two openings 63 therein, the countersunk bores 60 being in spaced alignment with tapped bores 52 in edge 54 of toolholder mount 22 and the openings 63 being in spaced alignment with dowel pins 53 mounted in edge 54 of toolholder mount 22. While openings 63 are not shown as extending through leg 58 of L-shaped member 56, it is apparent that they can be so extended with similar extensions of dowel pins 53. L-shaped member 56 further includes a second leg 61 (FIG. 6) having a tapered edge which forms a wall 62 which, when the L-shaped member 56 is connected to toolholder mount 22, defines an angle between wall 62 and lower tier 38 of upper face 36 of toolholder mount 22 of identical degrees as the angle defined by tapered wall 42 of upper tier 40 of toolholder mount 22. When assembled, the engagement of dowel pins 53 mounted in edge 54 of toolholder mount 22 with the walls of openings 63 in first leg 58 of L-shaped member 56 prevent L-shaped member 56 from rising or moving in an upward direction.

As best shown in FIGS. 4–6, toolholder body 64 generally comprises a six-sided metallic block 65 having a first side 66, a second side 67 opposite first side 66, a third side 70, a fourth side 71 opposite third side 70, an upper (fifth) side 74, and a lower (sixth) side 76 opposite upper (fifth) side 74, and a cylindrical bore 78 extending between first side 66 and second side 67, with cylindrical bore 78 being intersected by a chordal groove 80 and a chordal slit 82. The chordal slit 82 extends from cylindrical bore 78 to the third side 70 of metallic block 65 in diametrical alignment with chordal groove 80. The chordal slit 82 provides a pair of spaced furcations 84 and 86. As best seen in FIG. 6, toolholder body 64 includes a dove-tailed tang 88 adjacent its lower (sixth) side 76, defined by a pair of flat outer surfaces 90, a pair of parallel, tapered, surfaces 92 and 94, and lower (sixth) side 76 of metallic block 65. Toolholder body further includes two countersunk bores 96 (FIGS. 4 and 6) in upper side 74 of metallic block 65 which extends through furcation 84, chordal slit 82, and into furcation 86 where each bore 96 terminates into a tapped opening 98. Toolholder body 64 further includes a tapped bore 100 in its first side 66, running parallel to cylindrical bore 78, in dove-tailed tang 88. The tapered surfaces 92 and 94 adjacent the lower side 76 of metallic block 65 are such that they cooperate with the tapered wall 42 separating lower tier 38 and upper tier 40 of toolholder mount 22 and the tapered wall 62 of L-shaped member 26 to define a way which provides continuous, positive, engagements as shown in FIGS. 4 and 5.

Figure 8:
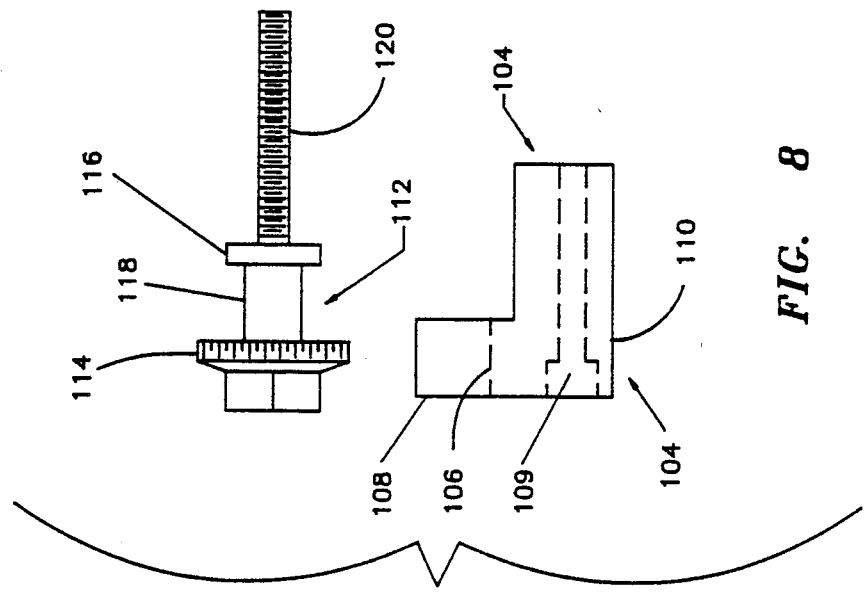
FIG. 8 is an exploded view of the vernier adjustment mechanism of the toolholder as shown in FIG. 4.

Adjustment means 102 for precisely adjusting the toolholder body 64 relative to the toolholder mount 22 is best illustrated in FIGS. 4 and 8 and comprise an L-shaped screw holder 104 having a U-shaped slot 106 in leg 108 and a pair of countersunk bores 109 which extend through its other leg 110 and being spaced such that they are in alignment with the tapped bores 48 in edge 50 of toolholder mount 22. A vernier, adjusting, screw 112 is provided for moving the toolholder body 64 relative to the toolholder mount 22 in the way provided by the tapered surfaces 92 and 94 of the dovetailed tang 88 and the tapered walls 42 and 62 of toolholder mount 22. Adjusting screw 112 comprises a calibrated knob 114 at one of its ends, a raised cylindrical shoulder 116 spaced from but adjacent calibrated knob 114, a reduced bearing portion 118 between calibrated knob 114 and cylindrical shoulder 116, and a threaded portion 120 adjacent its other end for threaded engagement in tapped bore 100 in dove-tailed tang 88 in toolholder body 64.

As best seen in FIG. 4, the calibrated knob 114 has indicia 134 thereon which, when read, against the fixed mark 136 on leg 108 of L-shaped member 104 allows the operator to make a fine, precision adjustment to the location of toolholder body 64 and tool 132 (See FIG. 2).

Prior to mounting a toolholder assembly 8 upon one side of toolslide 6, the toolholder assembly 8 is assembled except for the toolholder body 64 as explained hereinafter. The L-shaped screw holder 104 is mounted to edge 50 of toolholder mount 22 by means of two bolts 124 (one shown in FIG. 4) which are inserted into countersunk bores 109 for engagement with tapped bores 48 in edge 50 of toolholder mount 22 with the two bolts 124 being securely tightened. The vernier, adjusting, screw 112 is then mounted in the L-shaped screw holder 104 (as shown in FIG. 4) with the reduced bearing portion 118 of screw 112 resting in the bottom of U-shaped slot 106. The L-shaped member 56 is then loosely secured to edge 54 of toolholder mount 22 by first engaging the two dowel pins 53 in edge 54 of toolholder mount 22 with the walls of openings 63 in L-shaped member 56, then bolts (not shown) are inserted into the countersunk bores 60 in L-shaped member 56 for engagement with tapped bores 52 in edge 54 of toolholder mount 22. Bolts 126 are then inserted into each of countersunk bores 44 and 46 in toolholder mount 22 and clamping nuts 128 are then loosely attached to the threads of each bolt 126 which extends below lower face 24 of toolholder mount 22. The parts thus assembled are now ready for mounting on one side of toolslide 6 by starting at the end of toolslide 6 the farthermost away from the multiple spindle carrier assembly 10 and aligning protrusion 30 with the recess 15 in the side of toolslide 6 and aligning the clamping nuts 128 extending below lower face 24 of toolholder mount 22 with the openings 18 in the outside T-shaped channels 14 and sliding the assembled parts to its desired location on toolslide 6. Each bolt 126 is then tightened to pull its clamping nut 128 against the opposed shoulders 20 in the two outside inverted T-shaped channels 14. The toolholder body 64 with two bolts 130 (FIG. 4) already inserted in countersunk bores 96 and engaged with tapped openings 98 therein, is then mounted on toolholder mount 22 by generally aligning the tapered surfaces 92 and 94 of toolholder body 64 with the way or cross slide provided by the tapered wall 42 of toolholder mount 22 and tapered wall 62 of L-shaped member 56 and moving toolholder body 64 to a position wherein the threaded end 120 of the vernier, adjusting, screw 112 enters the tapped bore 100 in toolholder body 64. The adjusting screw 112 is then tightened to thus move the toolholder body 64 to an exact, desired, location. The bolts (not shown) which extend through the countersunk bores 60 in L-shaped member 56 are then tighten with the dowel pins 53 preventing any unwanted rising or upward movement of L-shaped member 56 which might cause the separation of tapered wall 62 with tapered surface 92 of toolholder body 64. A desired tool such as drill bit 132 (FIG. 2) is then inserted into cylindrical bore 78 of toolholder body 64 and bolts 130 are then tightened to cause the walls of cylindrical bore 78 to grasp the tool 132. The chordal groove 80 and the chordal slit 82 provide flexibility which allows the walls of cylindrical bore 78 to move upon the tighten or loosening of bolts 130.

If, after set-up, a precision adjustment must be made, the operator will merely loosen the bolts (not shown) extending through bores 60 of L-shaped member 56, turn the adjusting screw 112 to move the tool 132 to its exact, desired, location, and re-tighten the bolts (not shown).

While tapped bores 48 are only shown in edge 50 of toolholder mount 22, the edge (unnumbered) of toolholder mount 22 likewise includes similar tapped bores 48 to enable the mounting of L-shaped screw holder 104 to the opposite edge (unnumbered) of toolholder mount 22. Likewise, a tapped bore 100 is included in second side 66 of metallic block 65 for receiving the threaded portion 120 of adjusting screw 112 when L-shaped screw holder 104 is mounted to the opposite edge (unnumbered) of toolholder mount 22.

The numerous bolts incorporated in the toolholder can be configured to accept a conventional Allen wrench, screw driver or the like. Of course, the calibrated knob 114 might be turned by hand or its end might be configured to likewise accept a conventional Allen wrench or the like.

While the above description constitutes the preferred embodiment of the present invention, it will be appreciated that the invention is susceptible to modification, variation and change without departing from the proper scope and fair meaning of the accompanying claims.

I claim:

1. An adjustable toolholder for mounting on a toolslide of a machining apparatus, said adjustable toolholder comprising:
   means for grasping the tool;
   means for supporting said tool grasping means including a mount having an upper surface and a lower surface, said upper surface defining a way for slidably supporting and retaining said tool grasping means on said mount;
   means for securing said mount to said toolslide;
   means attached to said mount in engagement with said tool grasping means for controlled longitudinal adjusting movement of said tool grasping means in said way relative to said mount;
   said means for grasping said tool comprising a body member having a dove-tailed tang for cooperation with said way of said mount during said controlled longitudinal adjusting movement of said tool grasping means;
   said way on said mount comprising a tapered surface forming an integral part of said upper surface of said mount and a separate L-shaped member attached to said mount and having a tapered surface thereon; and
   a plurality of dowel pins mounted in one edge of said mount and a plurality of cooperating openings in one leg of said L-shaped member for preventing the upward movement of said L-shaped member relative to said mount.

2. The adjustable toolholder of claim 1 wherein said body member is provided with a bore having wall surfaces for supporting and gripping the tool and means for actuating said wall surfaces for grasping and releasing the tool.

3. The adjustable toolholder of claim 2 wherein said body member includes a chordal slit emanating from said bore and a chordal groove in said bore diametrically opposed to said chordal slit.

4. The adjustable toolholder of claim 3 wherein said bore of said body member is cylindrical in cross section, said body member is provided with first and second portions and first and second sides, said chordal slit disposed on said first side of said body member between said first and second portions of said body member to provide a cantilever relation for said first side of said first portion of said body member.

5. The adjustable toolholder of claim 4 wherein said first portion of said body member includes a pair of spaced openings in said first side thereof, and said second portion of said body member includes a pair of tapped openings in said first side thereof, said openings being in aligned relation, and fastener means disposed in said openings to define therewith said means for actuating said wall surfaces.

6. The toolholder of claim 5 wherein said means for controlled longitudinal adjusting movement of said tool grasping means relative to said mount includes a L-shaped bracket attached to said mount and an adjusting screw, said L-shaped bracket having a first leg and a second leg, said first leg having a U-shaped slot therein, said adjusting screw including a knob at one end, an enlarged shoulder adjacent to but spaced from said knob, a reduced bearing portion between said knob and said shoulder for mounting within said U-shaped slot in said first leg of said L-shaped bracket, threads on the other end of said adjusting screw for engagement with a threaded opening in said body member.

7. The adjustable toolholder of claim 6 wherein said means for controlled adjusting movement of said tool grasping means relative to said mount further includes calibrated indicia on said knob and a reference mark on said first leg of said L-shaped bracket for indicating the distance of movement of said body member relative to said mount.

8. An adjustable toolholder for mounting on a toolslide of a machining apparatus, said adjustable toolholder comprising:
   a body member for holding the tool, said body member including a bore, acchordal slit emanating from said bore and extending to a first side of said body member, a chordal groove in said bore diametrically opposed to said chordal slit, means for contracting and expanding the wall surfaces of said bore to grasp and release the tool, and a dove-tailed tang on a second side of said body member, said dove-tailed tang having a tapered first tail and a tapered second tail;
   a mount member for supporting said tool holding body member including an upper face, a lower face, a first side, and a second side, said upper face having an upper tier adjacent said first side of said mount member and a lower tier emanating from said second side of said mount member, said upper tier and said lower tier being separated by a tapered wall which is at acute angles relative to each of said lower and upper tiers, said tapered wall being adapted for engagement by said first tail of said dove-tailed tang of said tool holding body member;

an L-shaped member including a first leg for attachment to said second side of said mount member and a second leg for engagement with said lower tier of said mount member, said second leg having a tapered end surface adapted for engagement by said second tail of said dove-tailed tang of said tool holding body member;

means for securing said mount member to said toolslide; and means attached to a third side of said mount member in engagement with a third side of said tool holding body member for controlled longitudinal adjusting movement of said tool holding body member relative to said mount member in a way defined by said tapered end surface of said L-shaped member and said tapered wall separating said lower and upper tiers of said mount member.

9. The adjustable toolholder of claim 8 wherein said mount member and said L-shaped member incorporates means for preventing the upward movement of said L-shaped member relative to said mount member.

10. The adjustable toolholder of claim 9 wherein said means for preventing upward movement of said L-shaped member relative to said mount member includes a plurality of dowel pins and matching openings.

11. The adjustable toolholder of claim 10 wherein said bore of said body member is cylindrical in cross section, said body member is provided with first and second portions, said chordal slit disposed on said first side of said body member between said first and second portions of said body member to provide a cantilever relation for said first side of said first portion of said body member.

12. The adjustable toolholder of claim 11 wherein said first portion of said body member includes a pair of spaced openings in said first side thereof, and said second portion of said body member includes a pair of tapped openings in said first side thereof, said openings being in aligned relation, and fastener means disposed in said openings to define therewith said means for actuating said wall surfaces.

13. The adjustable toolholder of claim 12 wherein said means for controlled adjusting movement of said tool holding body member relative to said mount member includes a L-shaped bracket attached to said third side of said mount member and an adjusting screw, said L-shaped bracket having a first leg and a second leg, said first leg having a U-shaped slot therein, said adjusting screw including a knob at one end, an enlarged shoulder adjacent to but spaced from said knob, a reduced bearing portion between said knob and said shoulder for mounting within said U-shaped slot in said first leg of said L-shaped bracket, threads on the other end of said adjusting screw for engagement with a threaded opening in said third side of said tool holding body member.

14. The adjustable toolholder of claim 13 wherein said means for controlled adjusting movement of said tool holding body member relative to said mount member further includes calibrated indicia on said knob and a reference mark on said first leg of said L-shaped bracket for indicating the distance of movement of said tool holding body member relative to said mount member.

* * * * *